No. 726,079. PATENTED APR. 21, 1903.
A. LORD.
PLANT BASKET.
APPLICATION FILED APR. 28, 1902.
NO MODEL.
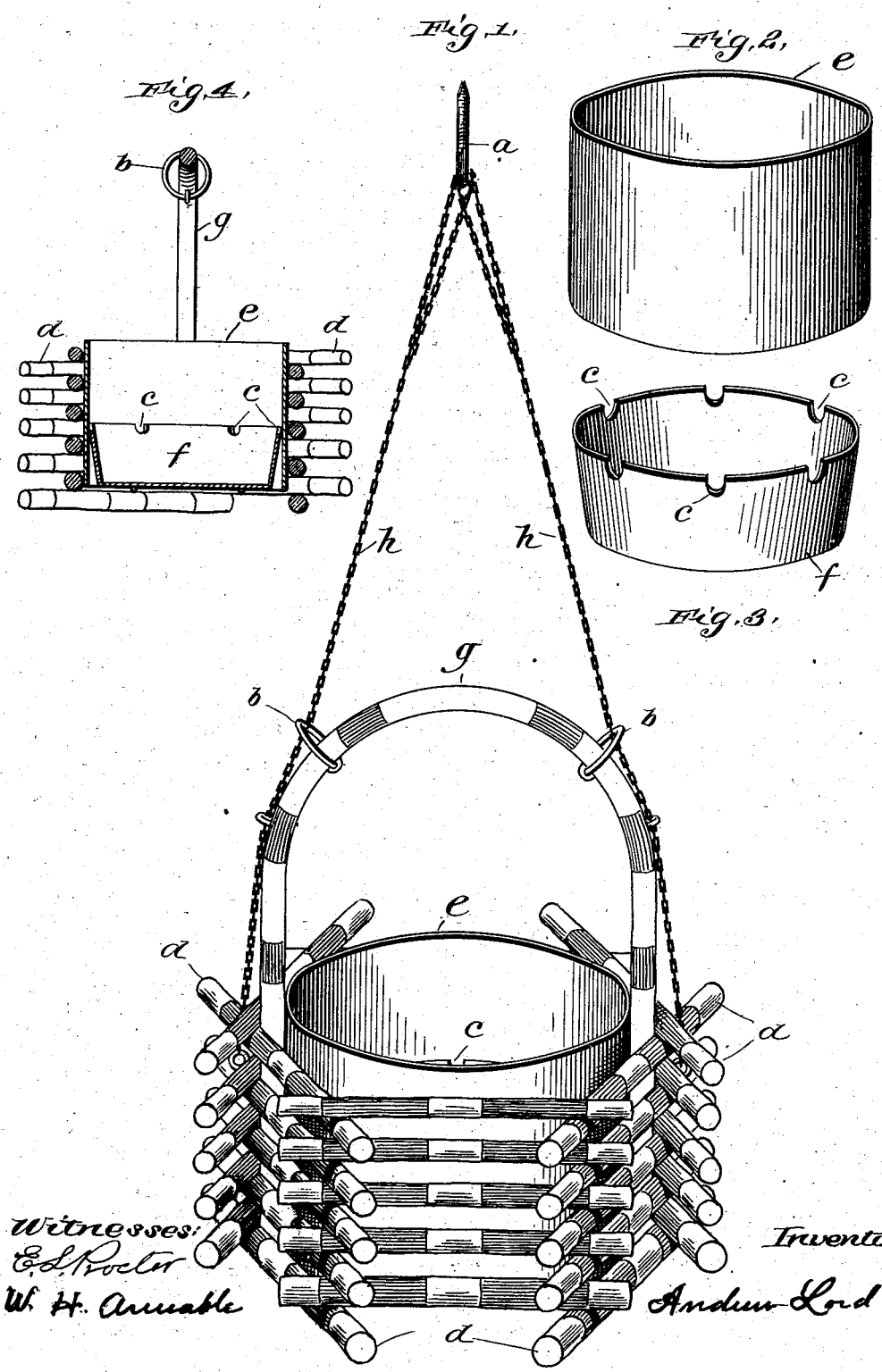

UNITED STATES PATENT OFFICE.

ANDREW LORD, OF LYNN, MASSACHUSETTS.

PLANT-BASKET.

SPECIFICATION forming part of Letters Patent No. 726,079, dated April 21, 1903.

Application filed April 28, 1902. Serial No. 105,028. (No model.)

*To all whom it may concern:*

Be it known that I, ANDREW LORD, a citizen of the United States, residing at Lynn, in the county of Essex and State of Massachusetts, have invented a new and useful Plant-Basket, of which the following is a specification.

The present invention relates to plant-baskets.

It is desirable that baskets for growing plants should be light, ornamental, durable, and inexpensive. In order that the plants therein may flourish, it is necessary that they should be constantly supplied with sufficient moisture, while protected from an excess thereof. The roots should be protected from overheating by the sunlight to which the baskets are exposed, but access of air to the earth should be facilitated in order that the roots may be properly ventilated. To attain these objects, the present invention contemplates the construction of a plant-basket in which the lower part is of waterproof material adapted to collect the excess of water supplied to the soil in the basket, while overflow-vents are provided to prevent the water in the bottom of the basket from rising above a certain level. These vents serve also to facilitate ventilation of the soil. The body of the basket is constructed in two parts, so that the upper part may be made of heat-non-conducting material, while the lower part is of metal. A further advantage of this construction lies in the fact that by making the lower part smaller in diameter than the upper part it may be raised therethrough, so that the earth and the roots of the plant may be conveniently removed intact, a feature of value in transplanting the plants in the basket. Since the lower part, which contains the water, is inclosed within the upper part, the latter is not in contact with the water contained in the lower part, so that it may be made of material, such as leather-board, which would be disintegrated by the long-continued action of standing water. This feature is not possessed by the ordinary form of flower-pot, in which the water is collected in a saucer in which the pot stands, for in such an arrangement the body of the pot will be partly immersed in the water which collects in the saucer, and hence must be made of material which cannot be injured by the water.

The invention comprises the above-described features, together with such other features of novelty as will be apparent to those skilled in the art to which the invention relates upon reference to the following description and claims and the drawings annexed thereto.

In the drawings accompanying this specification, Figure 1 is a perspective view of the complete plant-basket. Fig. 2 is a perspective view of the containing-receptacle. Fig. 3 is a perspective view of the water-containing pan, and Fig. 4 is a vertical section of the plant-basket on a reduced scale.

The illustrated embodiment of the invention is constructed as follows: A cylindrical receptacle $e$ forms the earth-containing part of the plant-basket. This receptacle is made of leather-board of a waterproof and non-heat-conducting nature, so that when the plant-basket is exposed to sunlight the earth and the roots contained in the receptacle may not be overheated and that the moisture of the earth may not disintegrate or decay the material. The bottom of the receptacle is closed by a metal tray or pan $f$, provided with one or more notches $c$ in its periphery. This pan serves to collect the water which permeates the earth in the basket and prevents it from dripping from the basket. It also helps to maintain a constant supply of water, making it unnecessary to water the plants as frequently as with other devices of this character. The notches $c$ serve as overflows to prevent the water rising in the pan above a predetermined level. The notches serve also as ventilating-openings through which air may have access to the earth, a feature of value to the health of the plants.

The parts already described are inclosed in a frame composed of sticks of wood or other material laid in the form of a polygon, the overlapping ends of the sticks being fastened together. A handle $g$ may be attached to the frame, and the basket may be suspended from a screw-eye $a$ or other sustaining device by a chain $h$ or its equivalent. To steady the basket, rings $b\ b$ are provided to attach the chain to the handle at some distance above the top of the body of the basket. The receptacle $e$ and pan $f$ may be supported on wires extending across the bottom of the frame.

A feature of the invention consists in the fact that by pushing against the bottom of the pan it may be raised through the body of the plant-basket, expelling the earth and the contained roots in convenient condition for transplanting.

Having thus described my invention, I claim as new and desire to secure by Letters Patent of the United States—

1. A plant-basket, having, in combination, a containing-receptacle open at both ends, and an imperforate pan contained therein fitting said receptacle, said pan being provided near its edge with a drainage-outlet, substantially as described.

2. A plant-basket, having, in combination, a cylindrical containing-receptacle open at both ends, a frusto-conical pan of less external diameter than the internal diameter of the containing-receptacle, and means for supporting the receptacle and pan, substantially as described.

3. A plant-basket, having, in combination, a cylindrical containing-receptacle open at both ends made of heat-non-conducting material, an imperforate pan of waterproof material fitting the said receptacle and closing the bottom thereof, and a support for said receptacle and pan, substantially as described.

4. A plant-basket, having, in combination, an open-ended receptacle of leather-board and a metal pan inclosed therein and closing the bottom thereof, substantially as described.

5. A plant-basket, having, in combination, an open-ended containing-receptacle, and a pan closing the bottom thereof, the edge of the pan being notched to provide openings between the said receptacle and the pan, substantially as described.

6. A plant-basket, having, in combination, a cylindrical containing-receptacle $e$ open at both ends, a pan $f$ of less external diameter than the internal diameter of the receptacle, the upper edge of said pan being provided with a series of notches $c$ to afford drainage for the pan, and a supporting-frame $d$ inclosing and supporting the receptacle and pan, substantially as described.

In testimony whereof I have signed my name to this specification in the presence of two subscribing witnesses.

ANDREW LORD.

Witnesses:
WILLIAM E. SALOMONS,
MELVIN B. PINKHAM.